United States Patent

[11] 3,603,625

| [72] | Inventors | Michael J. Cottrell<br>Washington, W. Va.;<br>Frederick W. Hudnall, Radford, Va. |
|---|---|---|
| [21] | Appl. No. | 38,070 |
| [22] | Filed | May 18, 1970 |
| [45] | Patented | Sept. 7, 1971 |
| [73] | Assignee | Textron Inc.<br>Providence, R.I. |

[54] TRENCHDUCT CONNECTOR UNITS
7 Claims, 7 Drawing Figs.

[52] U.S. Cl. .................................................. 287/189.36
, 52/221, 174/71 R, 174/72 R, 285/156, 285/424
[51] Int. Cl. ...................................................... F16b 7/18
[50] Field of Search............................................ 52/221,
220; 174/68 C, 71 R, 72 R, 96, 98; 285/128, 129,
424, 156; 287/189.36 R, 189.36 D

[56] References Cited
UNITED STATES PATENTS

| 3,023,032 | 2/1962 | Johnston et al. | 285/156 |
| 3,061,663 | 10/1962 | Reiland | 52/221 X |
| 3,166,633 | 1/1965 | Guzan et al. | 52/220 X |
| 3,204,378 | 9/1965 | Stuessel et al. | 52/221 |
| 3,262,238 | 7/1966 | Fork | 52/221 |
| 3,435,568 | 4/1969 | Hoseason et al. | 52/221 |
| 3,530,627 | 9/1970 | Carter et al. | 52/221 |
| 3,550,336 | 12/1970 | Halkovich et al. | 52/221 X |

Primary Examiner—David J. Williamowsky
Assistant Examiner—Wayne L. Shedd
Attorney—Frederick J. Olsson ABSTRACT: A unit used for interconnecting trenchduct runs which are in X- or T- or L-type patterns, the unit having one or more specially configured side rails which, in combination with post members, forms one or more openings adapting the unit for the particular pattern desired.

INVENTORS.
Michael J. Cottrell
Frederick W. Hudnall

BY FREDERICK J. OLSSON
ATTORNEY.

INVENTORS.
Michael J. Cottrell
Frederick W. Hudnall

BY

FREDERICK J. OLSSON
ATTORNEY.

INVENTORS.
Michael J. Cottrell
Frederick W. Hudnall
BY
FREDERICK J. OLSSON
ATTORNEY.

TRENCHDUCT CONNECTOR UNITS

This invention relates to electrical underfloor distribution systems and in particular relates to improvements for use in interconnecting trench section in L- or T- or X-type patterns.

The invention contemplates a unit comprised of a short body having a cross-sectional shape the same as the trench with which it is used, one or both ends of the body having conventional brackets for coupling the unit directly to the end of a run of trench and one or both of the side rails (depending upon whether the connection is the X- or T- or L-type) constructed with an opening to which another section of trench can be coupled.

The connector unit of the invention has several substantial advantages over the conventional L- or T- or X-type units now used in trenchduct systems.

One of the advantages of the invention is that in overall shape it is boxlike in form without protrusions and as such the same can be packaged in conventional cardboard shipping containers. This reduces handling and assembly costs for shipping and eliminates substantial breakage which often occurs with a conventional unit which is constructed in an actual T- or L- or X-form and is shipped by being strapped down on a pallet.

Another advantage of the invention is that fabricating costs are greatly reduced. This arises in one way by the fact that the necessary cutting, chamfering and welding for the fabrication of conventional units is eliminated. Additionally, the construction of the invention adapts it for being integrated right into the assembly line for trenches rather than being in a segregated unit requiring independent machines and labor as is the case of conventional units.

Another advantage of the invention is its adaptability to customizing without necessity of special fabrication. For example, certain trench systems may require that the X- or T- or L-connection be made at some desired place along a nine foot length of trench and the invention accommodates this inasmuch as the opening can be placed at any point along the side rail. Additionally, certain systems requires connections which take off at angles other than 90° and the invention easily accommodates this simply by biasing the end of the takeoff and correspondingly enlarging the opening in the unit.

The foregoing advantages among others will be readily apparent to those skilled in the art from the following description made in connection with the drawings wherein.

Figure 1:
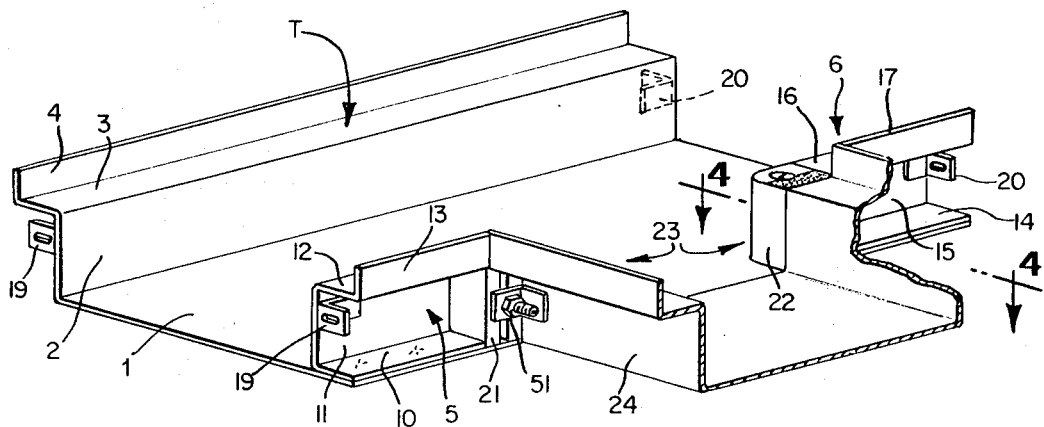
FIG. 1 is a perspective view showing the invention adapted for a T-type connection and with a section of trench connected thereto.

In FIG. 1 the T-type connector unit T comprises the flat generally rectangular-shaped base 1, the left-hand edge of which is formed with a riser 2 and extending outwardly from the riser 2 is a horizontal flange 3 and extending upwardly from the flange 3 is a vertical screed flange 4. The parts 2, 3 and 4 are shaped identically to the side rail of the trench with which the connector unit is to be used. The parts 2, 3 and 4 constitute a sidepiece.

On the right-hand side of the trench are sidepiece 5 and sidepiece 6 which are identical in cross section and in the particular instance also identical in length. The two sidepieces 5 and 6 are spaced from one another along the side of the trench and are shaped identically to the side rail of the trench to which the unit is to be connected. Referring to the sidepiece 5 this includes a foot section 10 which engages and is preferably spot welded to the base, a riser 11 which extends upwardly from the foot, a horizontal flange 12 which extends outwardly from the riser and is coplanar with the horizontal flange 3, a screed flange 13 extends up from the flange 12. The sidepiece 6 is similarly constructed having a foot 14, riser 15, a horizontal flange 16 and screed flange 17. The left hand end of the risers 2 and 11 carry the angle or brackets 19 and the right-hand ends of risers carry the angles 20.

As noted above, the base and the sidepieces are configured so that they will align or match with the trench section to which the unit is to be connected. The angles 19 and 20 are conventional and are adapted to abut similar angles in the trench sections, the fastening being made by the usual nuts and bolts. When the two sections of trench are connected in position, the connector unit T forms an extension of the trench interior. The horizontal flanges 3, 12 and 16 are used for supporting cover plates and tile trim pieces in the usual manner.

As mentioned above, the sidepieces 5 and 6 are spaced from one another. In the space between the side pieces are located the posts 21 and 22. These posts form an opening 23 to which the offset trenchduct will be connected. For example, in FIG. 1 a section of the trenchduct 24 is shown connected to the posts 21 and 22 in alignment with opening 23.

Figure 2:
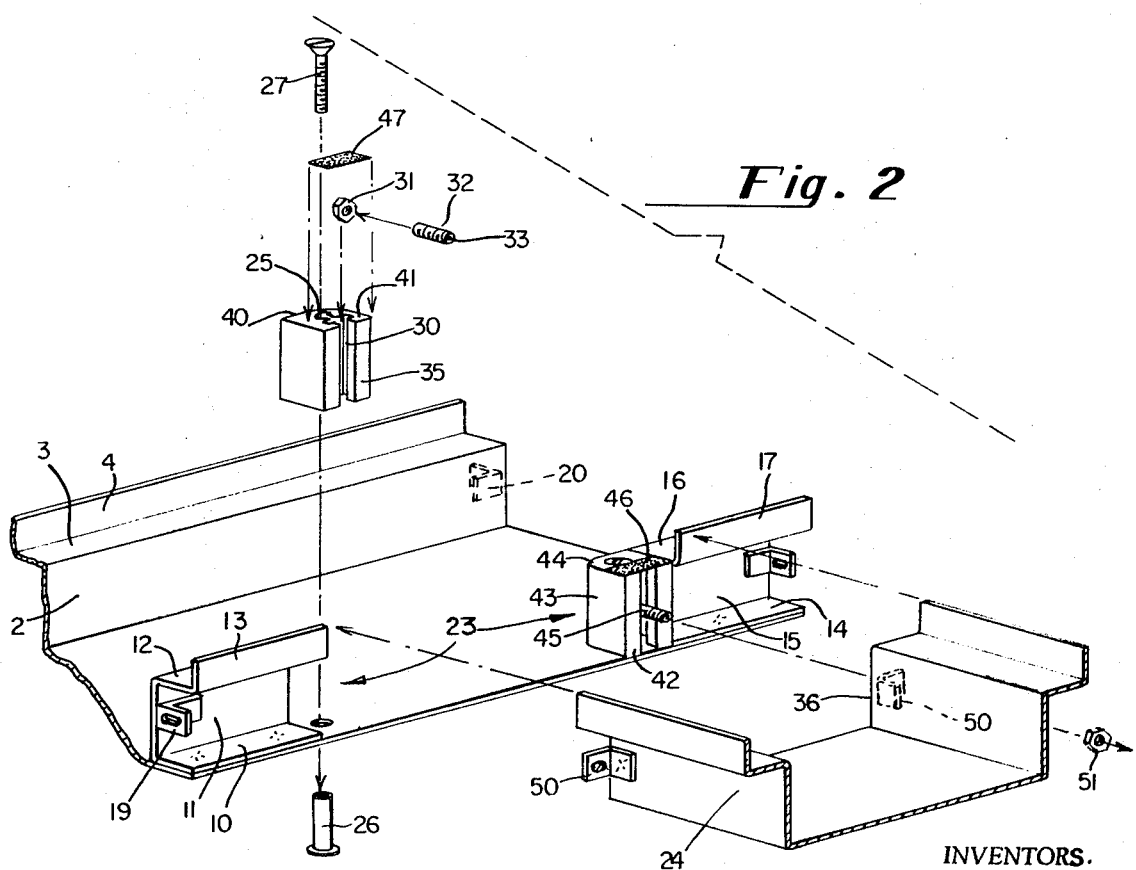
FIG. 2 is an exploded view of FIG. 1.
Figure 5:
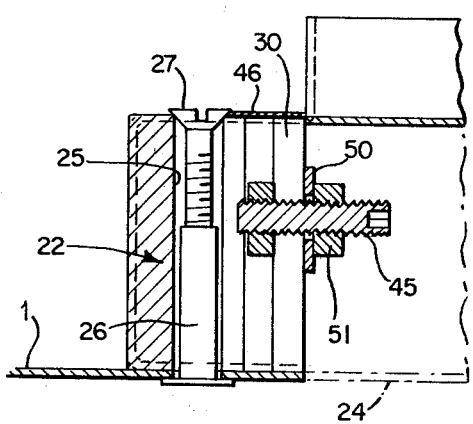
FIG. 5 is taken along lines 5—5 of FIG. 4.
Figure 4:
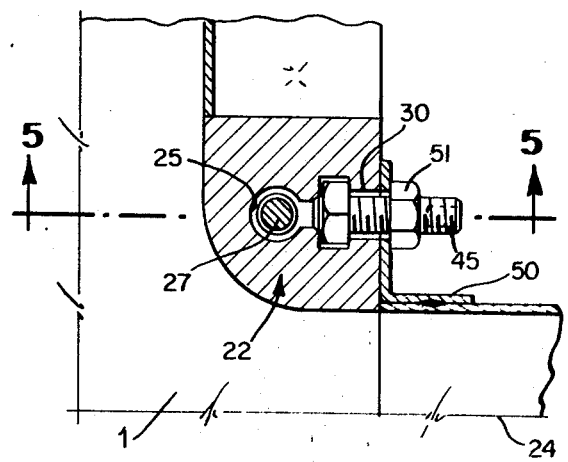
FIG. 4 is a view taken along the lines 4—4 of FIG. 1.

Each of the posts is of identical construction and the general configuration is indicate in FIG. 2 for post 21. Post 21 has a vertically extending circular slot 25 accommodating the nut 26 and screw 27 which fixedly lock the post on the base as indicated in FIG. 5 for the post 22. Adjacent the slot 25 is a T-shaped slot 30 which carries a not 31 into which is threaded the stud 32. The stud 32 carries an allenhead socket 33. The nut does not turn in the slot but can move vertically. The nut and stud can be adjusted vertically in the slot 30 and then the stud 32 turned up to become fixed in position.

The post has a contact surface 35 which faces the exterior of the trench and which is adapted to be engaged by the end 36 of the trench 24. The post also has a guide surface 40 which is generally arcuate and which extends, when the post is in position on the base, from the inside surface of the riser 11 outwardly to intersect contact surface 35. The post also has a top planar surface 41 which, when the post is in position is coplanar with the flanges 3, 12 and 16 to accommodate cover and tile trim. The post 22 has similar structure including the contact surface 42, the guide surface 43 and to surface 44. A stud 45 is similarly connected as the stud 32. To keep foreign matter and concrete out of the T-shaped slots, the top of each slot is covered as by tape 46.

The guide surfaces 40 and 43 each provide a continuous smooth inside surface to conductors extending through the connecting unit and through other trench sections.

For connecting the unit to the trench 24, the trench is brought up to the opening 23 and the angles pushed up over the studs 32 and 45 and locked in position as by the nuts 51.

From the foregoing description it will be apparent that the posts and the sidepiece opening structure conditions the connector for use in a T-type trench pattern. The opening concept is an important feature of the invention and is made possible by virtue of the nature of the side pieces 5 and 6 in conjunction with the posts 21 and 22.

The sidepieces 5 and 6 are of unitary construction and are formed separately from and independently of the base and side piece formed by posts 2, 3 and 4. To fabricate the unit, a piece of metal is bent to form the base 1, the riser 2, the flange 3 and the vertical flange 4. The sidepieces 5 and 6 are bent up from independent pieces of metal. The sidepieces are then set up on the base and a spot welded in position to provide the desired size of opening. The posts then complete the opening and provide a connection for the offset trench section.

By making the sidepieces 5 and 6 separately from the base and/or opposite side piece and fastening independently on the base, the location of the opening can be made at any desirable location and the length of the unit can be as long as desired. Thus, a whole length of conventional trench can be fabricated in the manner described and the opening put on one side at any point along the length. Further, if the takeoff section is to be at some angle other than 90° all that is necessary is to chamfer the abutting edge of the takeoff and then position the side pieces to obtain an opening whose width is a function of the cosine of the bias angle. In this way the construction is readily adaptable to situations for trenchduct runs not at 90°.

The side rail and post concept is particularly advantageous in that to make a connector for an X-type trench pattern, it is only necessary to repeat the sidepiece post structure for the right-hand side of the trench. This kind of construction is shown in FIG. 3.

Figure 3:
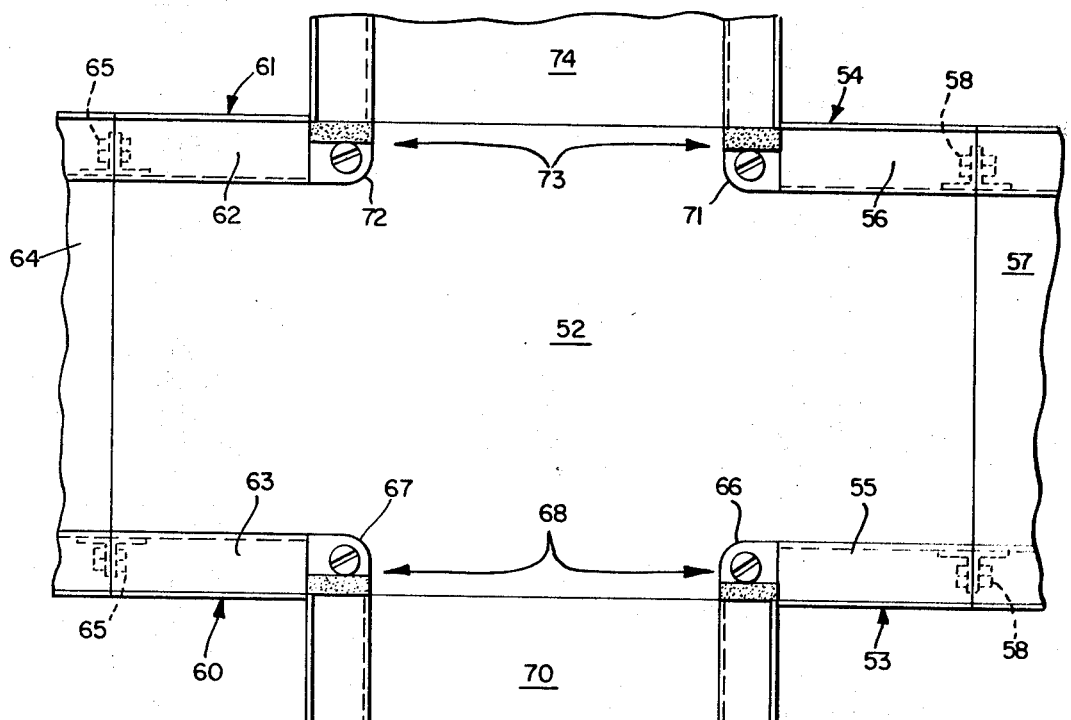
FIG 3 is a plan view illustrating the invention as adapted for an X-type connection with four sections of trench connected thereto.

In FIG. 3 the flat base is indicated at 52. A unitary side piece which has the same construction as the sidepieces 5 and 6 is indicated at 53. Another unitary sidepiece having identical construction is indicated t 54. These sidepieces respectively have the flanges 55 and 56. The sidepieces together with the base are configured to align with the trench section 57 and form an extension of the trench interior. The trench section is connected to the unit by the angle fastener arrangement 58.

On the left-hand side the unitary side piece 60 and unitary side piece 61 have identical construction and these carry the horizontal flanges 62 and 63. The base 52 and the unitary sidepieces 60 and 61 are configure to be in alignment with the trench section 64 which is connected by the bracket angle fastener arrangement 65.

Between the sidepieces 53 and 60, the posts 66 and 67 which are of the same construction as the posts 5 and 6 and form an opening 68 to receive the trench section 70 which is connected similarly as described above.

Between the side pieces 54 and 61 are the posts 71 and 72 which have the same construction as the posts previously described and these form an opening 73 to receive the trench section 74.

Figure 7:
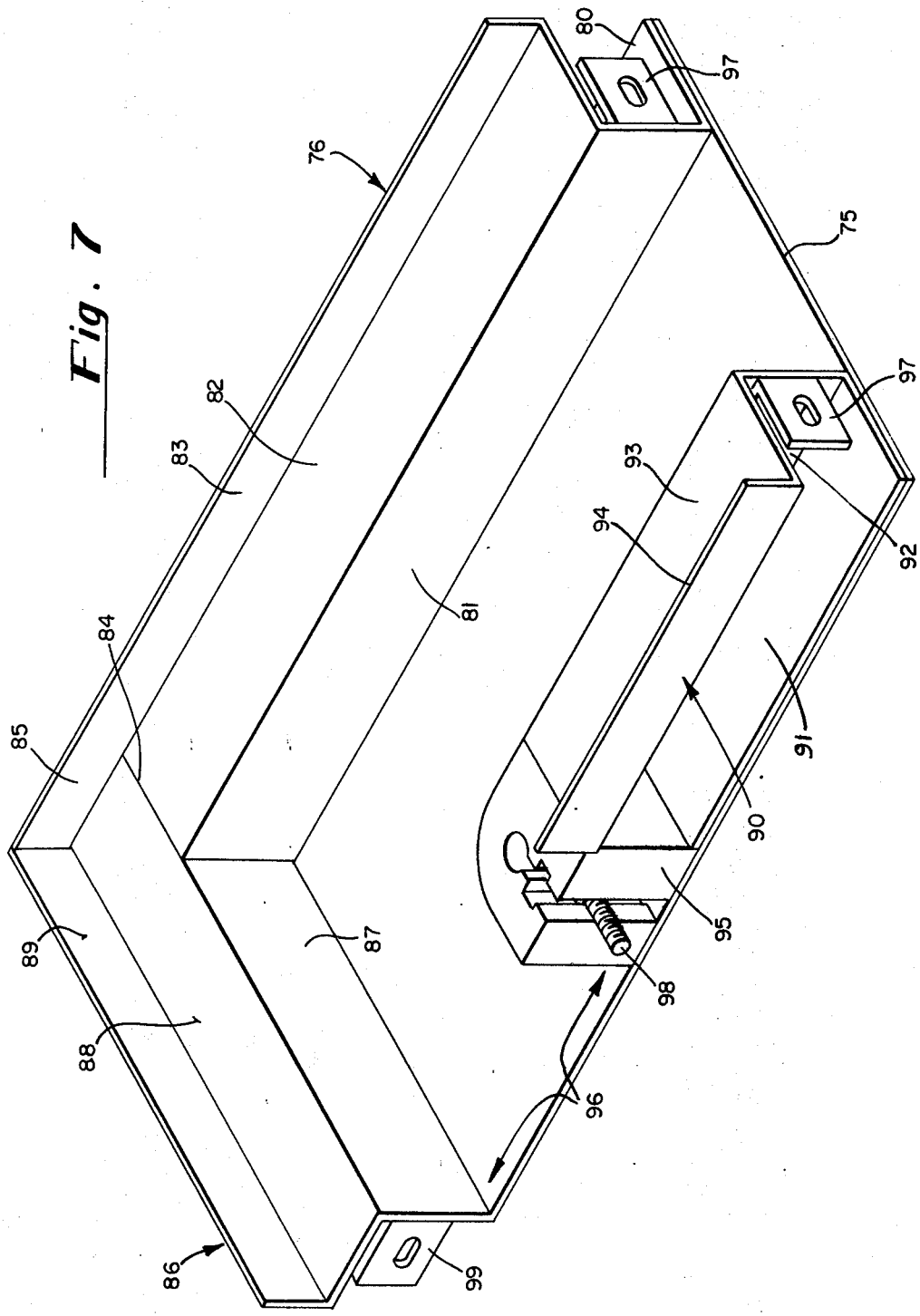
FIG. 7 is a perspective view of the invention adapted for an L-type connection.

In FIG. 7 we have illustrated a typical arrangement wherein the invention is applied for connecting trenches which are arranged in L-shaped patterns.

The base 75 is generally rectangular in shape and along the right-hand side is the side piece 76 which in cross section is identical to the sidepieces 5 and 6 of FIG. 1 having foot 80 on the base, riser 81, horizontal flange 82 and screed flange 83. The riser 81 and the horizontal flange 82 extend generally to the point indicated at 84 while the screed flange 83 extends as indicated at 85. On the left-hand side, the base 75 has been formed with a sidepiece 8 comprising the riser 87, horizontal flange 88 and screed flange 89. As indicated, these form the sidepiece 86. The risers and flanges abut respective counterparts as indicated and the parts are welded (on the underside) to make firms joints. It will be seen that the sidepieces 76 and 86 make up, in effect, a single sidepiece which has the two sections extending substantially at right angle to each other.

On the left-hand side of the trench the sidepiece 90 has a foot 91, riser 92 horizontal flange 93 and screed flange 94. All of the horizontal flanges 82, 88 and 93 are coplanar to accommodate a trench cover.

A post 95 which has the same construction as post heretofore described is connected to the base adjacent to the riser 92 of sidepiece 90 and is spaced form the sidepiece 86 to form the opening 96.

The riser 81 and 92 carry the angle 97 to which a section of trench can be connected. The post 95 carries the stud 98 and the riser 87 carries the angle 99. These are used for connecting the other trench sections.

Figure 6:
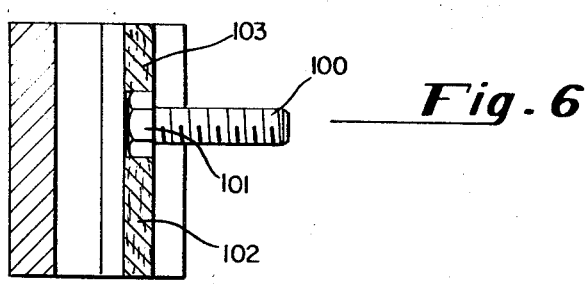
FIG. 6 is a modification of the connecting stud arrangement illustrated in FIGS. 4 and 5.

The nut-stud arrangement 31–32 described previously is preferred. However, indicated in FIG. 6 is an alternative arrangement comprising a conventional bolt 100, the head 101 of which is within the T-shaped slot of the position of the bolt is determined by the filler pieces 102 and 103.

From the foregoing description it will be apparent that regardless of the type of trench pattern, i.e., X or L or T, the unit of the invention always partakes of a boxlike shape. The only protrusion so to speak is one or more of the fastening studs. Thus, the structure of the connector desirably adapts the same for packaging in the conventional corrugated shipping container with appropriate fillers. This results in a great deal of savings with respect to labor and material. Also, those skilled in the art will appreciate that the structure of the units adapts the same for integration right into the conventional trench assembly lines. The same tools and labor used in fabricating trench are used for fabricating the connector units.

We claim:

1. In a trenchduct connector unit to provide a connection between two trenchduct sections oriented at an angle to one another:
   a flat base;
   a sidepiece connected to one side of the base and having a flange disposed above and extending parallel to the base;
   a unitary second sidepiece disposed on the opposite side of the base and comprising a foot section engaging and connected to the base, a riser extending upwardly from the foot and a flange extending from the top of the riser coplanar with first said flange, the base and sidepieces and flanges thereof being configured to align with one of the trench sections to which the unit is to be connected and form an extension of the trench interior and said flanges being for use in supporting a trenchduct cover;
   a post connected to the base adjacent said riser, the post forming one side of an opening to which the other trench section is to be connected and the post having a contact surface and a guide surface, the contact surface extending up from the base and facing the exterior of the trench and the contact surface being for use in engaging the edge of said other section of trench, the guide surface extending from the inside surface of said riser and intersecting said contact surface and the guide surface being for use in presenting a smooth surface to conductors extending through the connector unit and into said other trench sections; and
   a stud connected to the post and extending outwardly normal to said contact surface for use in joining the connector unit with said other trench section.

2. A T-type connector unit to provide a connection between two trenchduct sections oriented at an angle to one another;
   a flat base;
   a first unitary sidepiece disposed on one side of the base and including a flange extending substantially parallel said base;
   a second unitary sidepiece disposed along said one side of the base and spaced from said first sidepiece and including a flange coplanar with first said flange;
   a third sidepiece connected to the opposite side of the base and having a flange coplanar with first said flange, said base and side pieces and the flanges thereof being configured to align with one of the trench sections to which the unit is to be connected and form an extension of the trench interior and said flanges being for sue in supporting a trenchduct cover;
   a first post connected to the base adjacent first said sidepiece;
   a second post connected to the base adjacent said second sidepiece, the two posts forming an opening to which the other trench section is to be connected; and
   on each post, a guide surface for use in presenting a smooth surface to conductors extending through the connector unit and into the said trench sections.

3. A construction in accordance with claim 2 further including a pair of studs respectively connected to the posts and extending outwardly of said opening and being for use in joining the unit with said other trench section.

4. An L-type connector unit to provide a connection between two trenchduct sections oriented at an angle to one another:
   a flat base;

a first side piece connected to the base and comprising a first section and a second section, the first section extending along one side of the base and the second section extending substantially at right angles to the first section along an adjacent side of the base, the first sidepiece having a first flange disposed above and extending parallel to the base;

a second sidepiece disposed on the side of the base opposite said first section and spaced from said second section, the second side piece having a second flange substantially coplanar with said first flange and said first section and said second sidepiece being configured to align with one of the trench sections to which the unit is to be connected to form an extension of the trench interior and said flanges being for use in supporting a trenchduct cover; and a post connected to the base adjacent said second sidepiece, the post and said second section forming an opening to which the other section of the trench is to be connected, the post having a guide surface.

5. A construction in accordance with claim 4 further including a stud connected to said post and being for use in joining the connector unit with said other section of trench.

6. An X-type connector unit to provide a connection between four trenchduct sections oriented at angle to one another;

a flat base;

a first unitary sidepiece disposed on one side of the base and including a flange extending substantially parallel said base;

a second unitary sidepiece disposed on the opposite side of the base and including a flange coplanar with first said flange, said base and first and second side pieces and the flanges thereof being configured to align with the first of the trench sections to which the unit is to be connected and form an extension of the trench interior and said flanges being for use in supporting a trenchduct cover;

a third unitary piece disposed on said one side of the base and spaced from said first piece and including a flange coplanar with first said flange; and a fourth unitary sidepiece disposed along said one side of the base and spaced from said first side piece and including a flange coplanar with first said flange, said base and said third and fourth sidepieces and the flanges thereof being configured to align with the second of the trench sections to which the unit is to be connected and form an extensions of the trench interior and said flanges being for use in supporting a trenchduct cover;

a first post connected to the base adjacent said first sidepiece;

a second post connected to the base adjacent said third sidepiece, the two posts forming an opening to which the third of the trench sections is to be connected;

a third post connected to the base adjacent said second side piece;

a fourth post connected to the base adjacent said fourth sidepiece, the two posts forming an opening to which the fourth of the trench section is to be connected; and on each of said posts, a guide surface for use in presenting a smooth surface to conductors extending through the connector unit and into said trench sections.

7. A construction in accordance with claim 6 further including a first pair of studs respectively connected to the first and second posts and extending outwardly of said opening and being for use in joining the unit with said third trench section; and a second pair of studs respectively connected to the third and fourth posts and extending outwardly of said opening and being for use in joining the unit with said fourth trench section.